(12) United States Patent
Beck et al.

(10) Patent No.: US 10,719,654 B2
(45) Date of Patent: Jul. 21, 2020

(54) PLACEMENT AND TIMING AWARE WIRE TAGGING

(71) Applicant: INTERNATIONAL BUSINESS MACHINES CORPORATION, Armonk, NY (US)

(72) Inventors: Manuel Beck, Kirchheim unter Teck (DE); Florian Braun, Leinfelden-Echterdingen (DE); Lukas Dällenbach, Altdorf (DE); Heinz Josef Hemmes, Weil im Schoenbuch (DE); Jesse P. Surprise, Highland, NY (US); Marvin von der Ehe, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 15/823,625

(22) Filed: Nov. 28, 2017

(65) Prior Publication Data

US 2019/0163862 A1 May 30, 2019

(51) Int. Cl.
*G06F 30/398* (2020.01)
*G06F 30/394* (2020.01)
*G06F 119/12* (2020.01)

(52) U.S. Cl.
CPC .......... *G06F 30/398* (2020.01); *G06F 30/394* (2020.01); *G06F 2119/12* (2020.01)

(58) Field of Classification Search
CPC ............. G06F 17/5081; G06F 17/5077; G06F 2217/84; G06F 30/398; G06F 30/394; G06F 2119/12; G06F 30/392; G06F 2111/04
See application file for complete search history.

(56) References Cited

U.S. PATENT DOCUMENTS

| | | | | |
|---|---|---|---|---|
| 6,615,401 B1 * | 9/2003 | Gasanov | ............... | G06F 17/505 257/265 |
| 7,895,557 B2 * | 2/2011 | Alpert | ................... | G06F 17/505 716/108 |
| 7,921,398 B2 | 4/2011 | Curtin et al. | | |

(Continued)

OTHER PUBLICATIONS

Li, et al., "Fast Interconnect Synthesis with Layer Assignment," Proceedings of the 2008 International Symposium on Physical Design, ISPD '08, Apr. 13-16, 2008, Portland, Oregon, USA, Copyright 2008, ACM, pp. 71-77.

*Primary Examiner* — Nha T Nguyen
(74) *Attorney, Agent, or Firm* — Samuel A. Waldbaum

(57) ABSTRACT

A method for processing design data for a semiconductor circuit may be provided. The design data describe a signal line and related physical characteristics. The method comprises receiving the design data for the signal line, receiving constraint data describing a blockage area, and determining a segment of the signal line that would overlap with the blockage area assuming a direct path from the source to the sink. The method comprises further determining for the segment, based on the length of the segment, whether the segment is route-able without inserting a buffer while meeting the timing constraints, and modifying, in case a segment is not route-able without inserting a buffer, the physical characteristics of the signal line. Thereby, the determining the segment, the determining whether the segment length is route-able, and the modifying the physical characteristics is performed before placing buffers in the signal line and routing the signal line.

14 Claims, 5 Drawing Sheets

(56) References Cited

U.S. PATENT DOCUMENTS

| | | | | |
|---|---|---|---|---|
| 8,407,650 B1* | 3/2013 | Avidan | ............... | G06F 17/5077 |
| | | | | 716/126 |
| 8,769,470 B2 | 7/2014 | Dai et al. | | |
| 8,881,089 B1 | 11/2014 | Alpert et al. | | |
| 8,930,873 B1* | 1/2015 | Alpert | ............... | G06F 17/5081 |
| | | | | 716/111 |
| 9,092,591 B2* | 7/2015 | Alpert | ............... | G06F 17/5077 |
| 9,141,740 B2 | 9/2015 | Liu et al. | | |
| 9,171,112 B2 | 10/2015 | Kalpat et al. | | |
| 10,031,994 B1* | 7/2018 | Liu | ................... | G06F 17/5072 |
| 2005/0121698 A1* | 6/2005 | Reynolds | ........... | G06F 17/5068 |
| | | | | 257/208 |
| 2006/0288319 A1* | 12/2006 | Eichenseer | ........ | G06F 17/5031 |
| | | | | 716/114 |
| 2009/0106709 A1* | 4/2009 | Carney | .............. | G06F 17/5031 |
| | | | | 716/132 |
| 2009/0187870 A1* | 7/2009 | Yifrach | .............. | G06F 17/5072 |
| | | | | 716/119 |
| 2011/0320992 A1* | 12/2011 | Alpert | ............... | G06F 17/5077 |
| | | | | 716/106 |
| 2012/0240093 A1* | 9/2012 | Alpert | ............... | G06F 17/5031 |
| | | | | 716/129 |
| 2014/0131885 A1* | 5/2014 | Samadi | .............. | G06F 17/5068 |
| | | | | 257/774 |
| 2014/0181765 A1* | 6/2014 | Dhar | .................... | G06F 17/505 |
| | | | | 716/104 |
| 2015/0213188 A1* | 7/2015 | Chowdhury | ....... | G06F 17/5081 |
| | | | | 716/114 |

\* cited by examiner

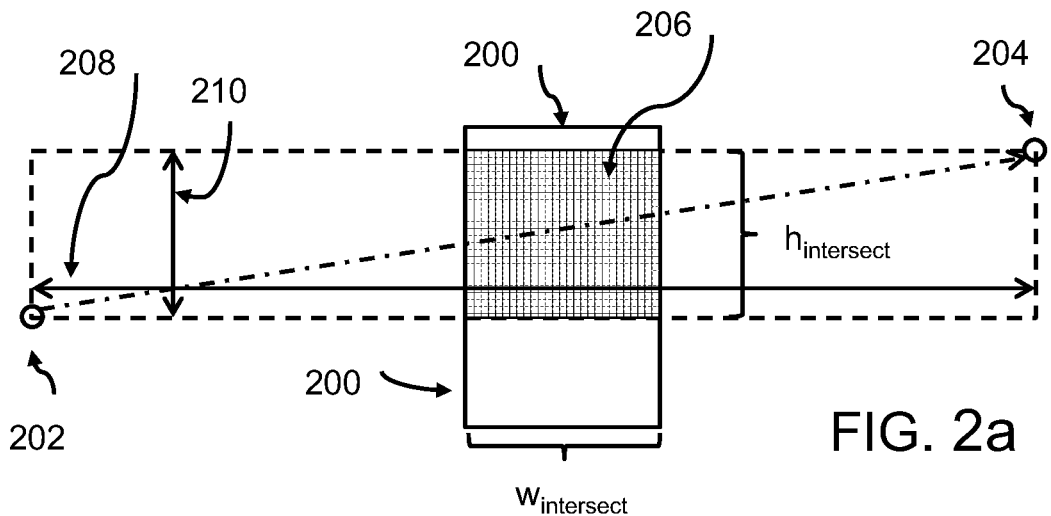
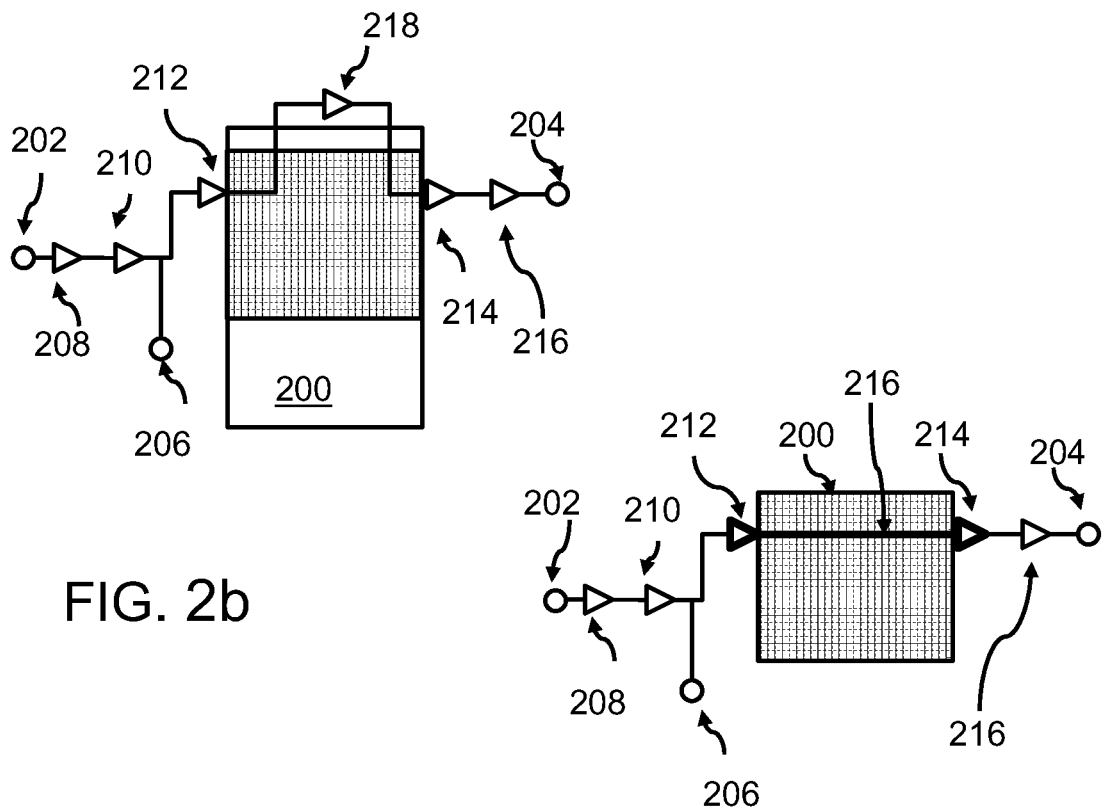
FIG. 2a
FIG. 2b
FIG. 2c

PLACEMENT AND TIMING AWARE WIRE TAGGING

BACKGROUND

Embodiments of the invention generally relate to processing design data for a semiconductor circuit, and more specifically, to a blockage area aware and placement and timing aware wire tagging for a layout of a semiconductor chip design.

Designing very large scale integration (VLSI) chips is a science and art at the same time. Modern tools help engineers with device placements and routing of signal lines. However, the process is far from being perfect and it cannot be automated completely. Currently, at the end of an implementation phase (also called Engineering Changed Order phase) of macros/rows/units/course/chips, there may have been an unrouteable netlist of routed netlists in which additional nets have to be implemented. In many times, these netlists have critical and uncritical nets or, need to cross blocked areas on the die. During the implementation process some of the nets may have been changed from critical to uncritical. But once changed they still use the same high wire resources needed at the beginning. However, one of the goals of very large scale integration (VLSI) design is to minimize required die areas and thus minimize power requirements. This is because additional buffers are not required or timing constraints may be met otherwise.

In such design processes, blockage areas require special attention because they have to be protected from inserting additional buffers into their middle. Therefore special attention is given to routing signal lines across or around such blockage areas. A result, at the end of a routing process, non-routed signal lines may still exist. Then, often a manual process starts to route the remaining signal lines that have not been routed automatically. This is a time-consuming, tedious, iterative and error-prone process which should be avoided. Additionally, experienced and thus expensive chip designers are required.

SUMMARY

According to one aspect of the present invention, a method for optimizing design data for a semiconductor circuit may be provided. The design data may describe—among others—a signal line and physical characteristics of the signal line. The method may include receiving the design data for the signal line originating at a source and ending at a sink, receiving constraint data describing a blockage area that must be free of buffers present along the signal line from the source to the sink and determining a segment and a related length of the signal line that would overlap with the blockage area assuming a direct path from the source to the sink. The method may further include determining for the segment, based on the length of the segment, whether the segment is route-able without inserting a buffer in the segment while meeting the timing constraints received as part of the constraint data, and, in case a segment cannot be routed without inserting a buffer, modifying the physical characteristics of the signal line. Thereby, the determining the segment and the related length, the determining whether the segment length can be routed, and the modifying the physical characteristics of the signal line may be performed before placing buffers in the signal line and routing the signal line.

According to another aspect of the present invention, a related system for optimizing design data for a semiconductor circuit may be provided.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention, are apparent from the examples of embodiments to be described hereinafter and are explained with reference to the examples of embodiments but to which the invention is not limited.

Preferred embodiments of the invention will be described, by way of example only, and with reference to the following drawings.

Figure 1:
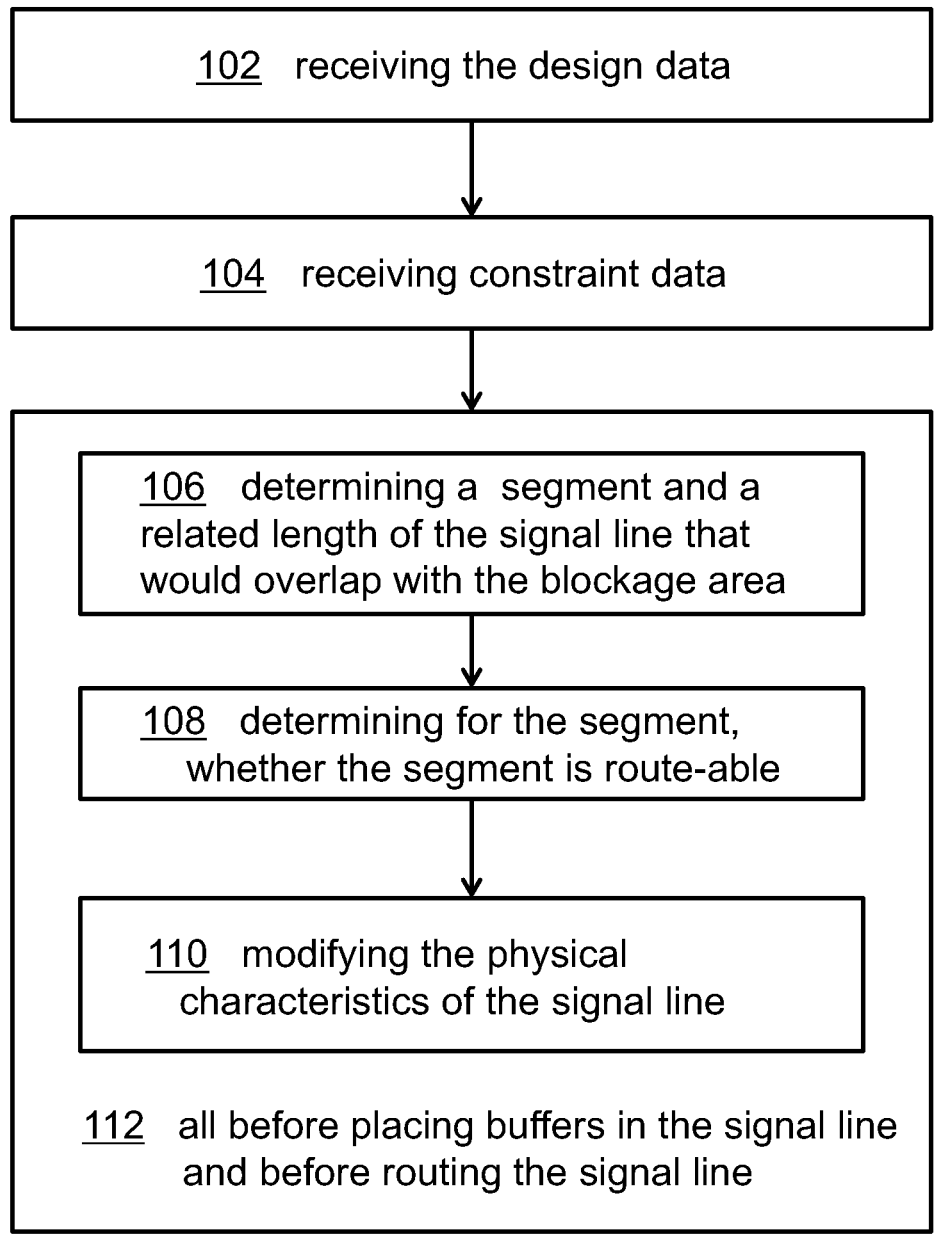

FIG. 1 shows a block diagram of an embodiment of the inventive method for optimizing design data for a semiconductor circuit.

FIGS. 2a, 2b and 2c illustrate the concept of the here proposed solution for crossing a blockage area in contrast to existing routing approaches.

Figure 3:
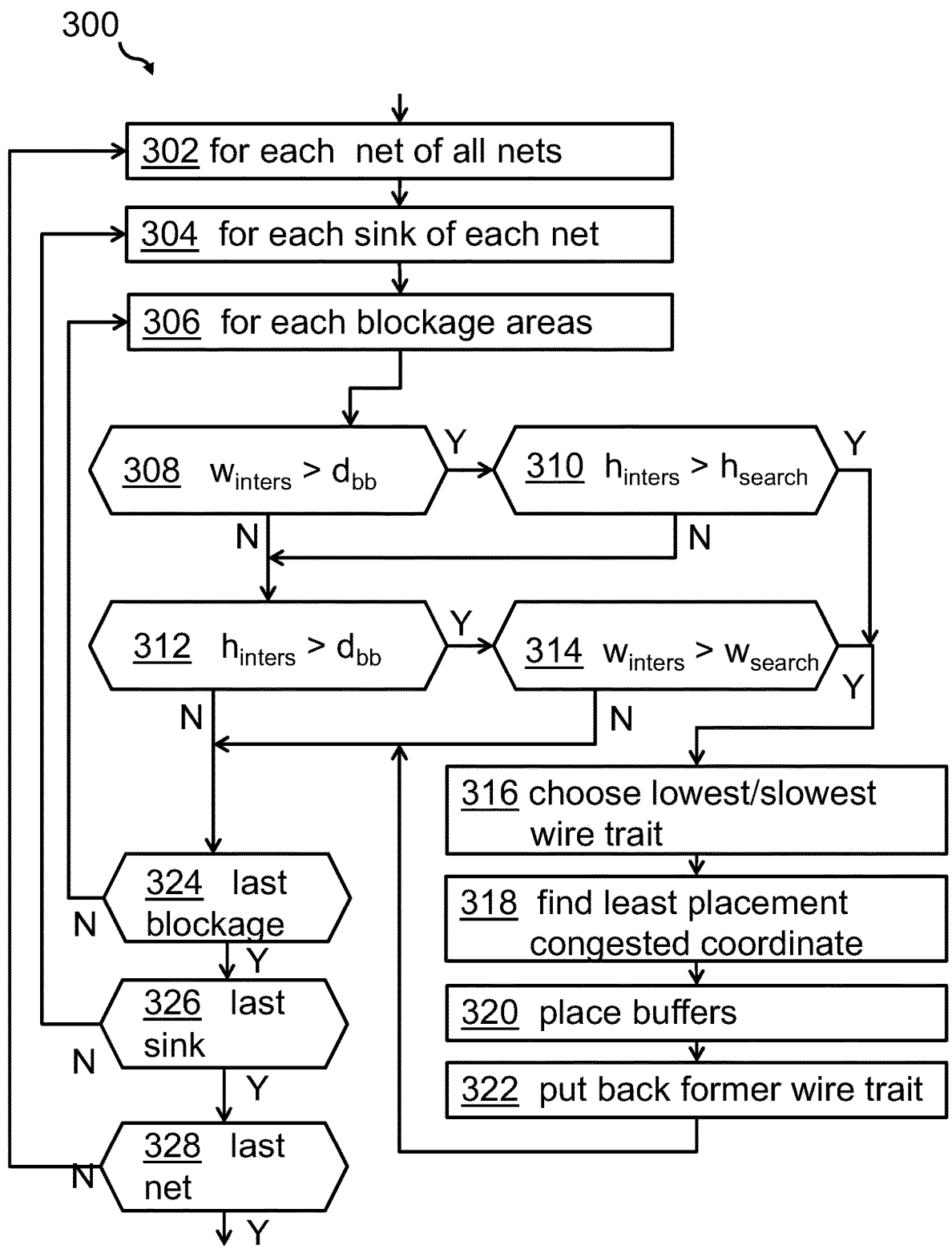

FIG. 3 shows an embodiment of a more detailed flowchart outlining the proposed concept.

Figure 4:
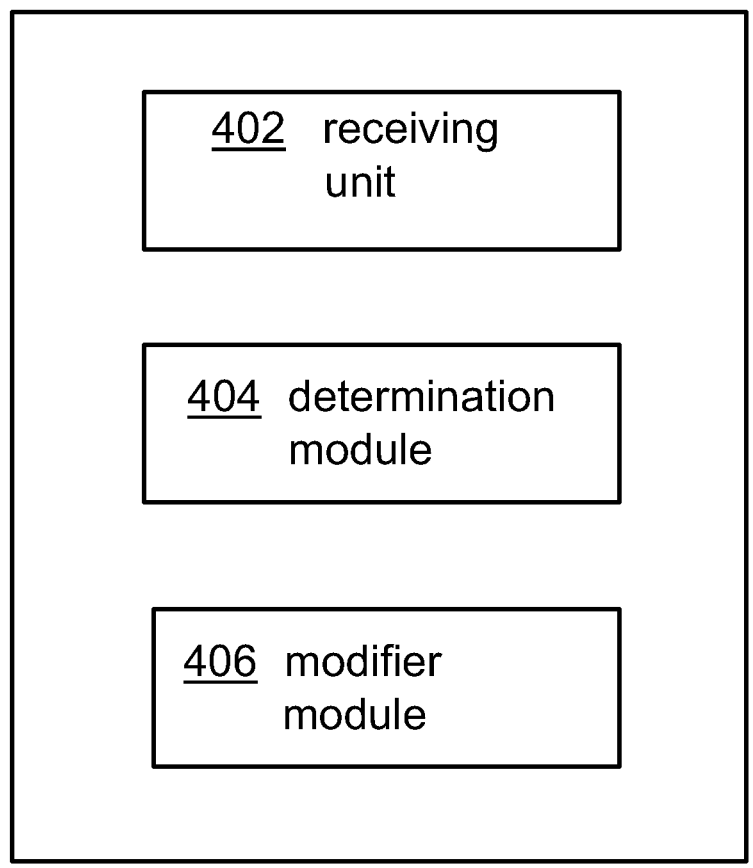

FIG. 4 shows an embodiment of a system for optimizing design data for a semiconductor circuit.

Figure 5:
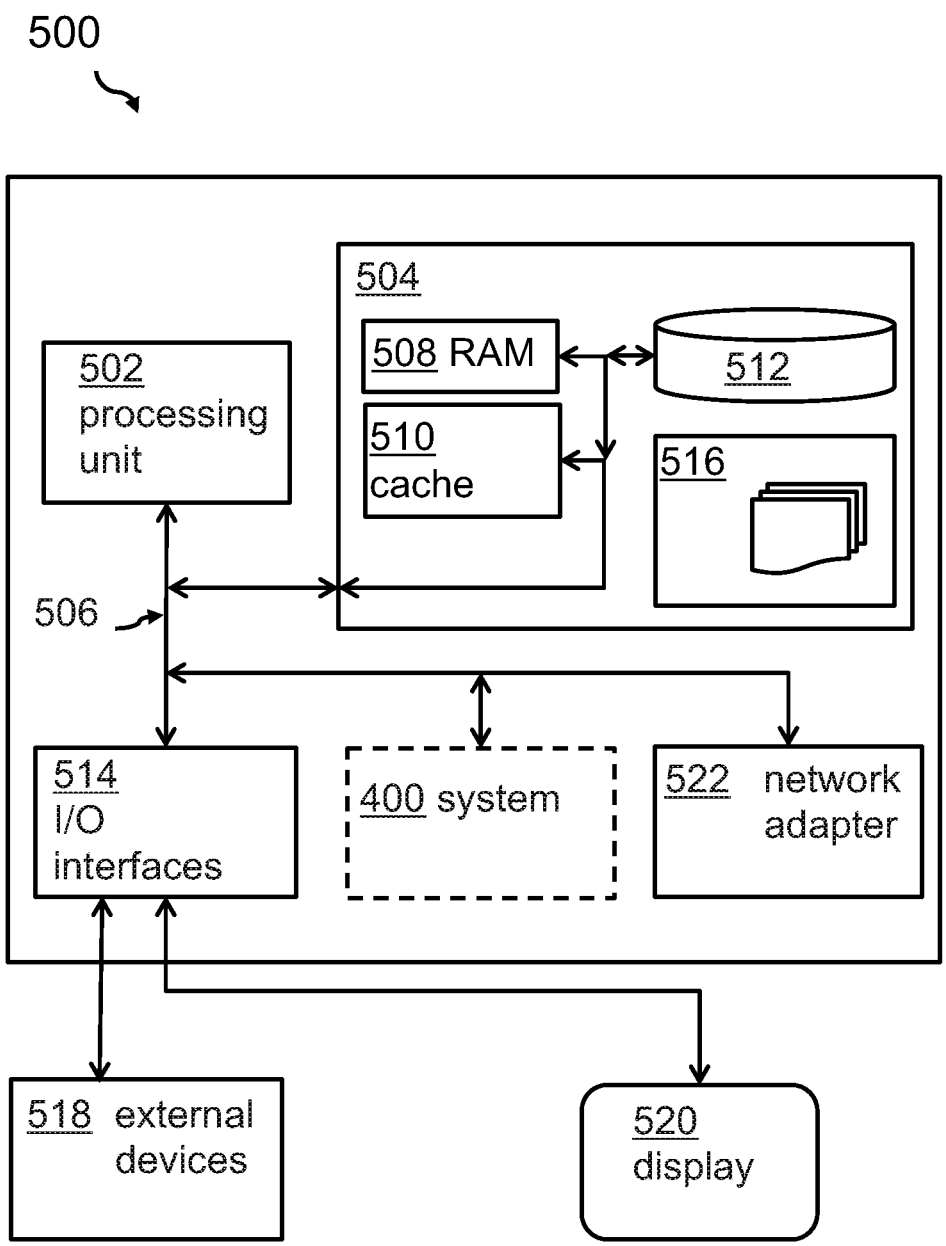

FIG. 5 shows an embodiment of a computing system comprising the system for optimizing design data for a semiconductor circuit.

DETAILED DESCRIPTION

In the context of this description, the following conventions, terms and/or expressions may be used.

The term 'design data' may denote an abstract description of the function of an electronic circuit including a plurality of electronic devices, its specifications and its interconnections. Additionally, timing constraint data, placement constraint data, and temperature range data, etc., may be part of the design data. Typically, design data may be generated by a chip design tool.

The term 'semiconductor circuit' may denote a plurality of electronic circuits interconnected with connection of metal layers. A skilled person knows that semiconductors are manufactured layer by layer in order to have passive and active layers within each semiconductor device. Today, typical VLSI chips (very large scale integration) integrate several million electronic devices into one semiconductor chip.

The term 'signal line' may denote a connection from a source terminal to a sink terminal Depending on the length, i.e., distance, taking into account typical Manhattan routing metrics, buffers need to be integrated into the signal line in order to ensure that the "clean waveform" arrives at the sink. Over the course of the wire of the signal line segments, signal may get smeared.

The term 'physical characteristics' may denote a couple of parameters and related parameter values describing the signal line. Between two buffers, the signal line may be implemented as a wire. The wire may be described in terms of material, total length, as well as width and height, i.e., cross-section of the wire, and/or material used for the wire layer. Another typical parameter may be the delay per length of the wire.

The term 'source' may denote an origin of a digital signal in a semiconductor design. In contrast, the term 'sink' may denote the contrast of a source, i.e., the target for the digital signal.

The term 'constraint data' may denote here timing constraints of individual signal lines as well as areas on the chip in which no additional buffers may be placed. One of the reasons may lie in the fact that the blockage area includes a very complex network of electronic devices, like an adder or an array.

The term 'blockage area' may denote an area on the physical semiconductor in which no other electronic device—in particular buffers—may be placed. They may only be placed beside the blockage area resulting in so-called scenic routes. Hence, the blockage area may describe a two-dimensional space on the semiconductor die as well as the number of layers not to be used for transitory purposes of other signal lines not interacting with the electronic devices in the blockage area.

The term 'segment' may denote a connection, i.e., a wire, between two buffers along a longer signal line.

The term 'route-able' may denote that a layout of electronic devices may physically be interconnected according to the rules of the abstract schematic circuit. The process of routing—in an abstract sense—may be seen as the process of selecting a path for traffic or connections in a network. In a figurative sense of the connections between electronic devices (source and sink), the routing may denote the process of finding the correct electrical route between two endpoints according to rules of the so-called Manhattan process.

The term 'buffer' may denote an amplifier integrated into a wireline in order to guarantee for a non-degeneration of a signal.

The term 'another wire layer' may denote a wire layer independent of the current wire layer of a wire or signal path. A wire established in a lower wire layer may typically be connected through a via from one metal layer to another.

It may also be noted that a signal line may describe a theoretical connection between a source and a sink before the routing and the insertion of additional buffers may be started. Thus, the signal line may be seen as the wire of a metal layer including one or more buffers.

The proposed method for optimizing design data for a semiconductor circuit may offer multiple advantages and technical effects.

It supports the chip designers in their goal to tack signal lines using the lowest and slowest wire traits that meet slack and slew constraints to meet power, area and number of metal layers necessary for the VLSI design. It may no longer be necessary to go around blockage areas, using so-called detours in order to implement additional buffers outside the blockage area. This typically would lead to unnecessary congestions due to so-called scenic wireless surrounding the blockage area. As a consequence of this state-of-the-art implementation, timing violations due to increased delay, caused by the scenic wires happen.

The here proposed solution is suitable for circumventing this problem at a very early point in time of the design process. State-of-the-art implementations require often a manual routing of an unrouteable netlist. This manual routing may no longer be necessary using the proposed inventive concept, which allows tagging segments of signal lines crossing routing blockage areas to meet signal slew constraints.

An advantage is also that from a timing perspective (slack) the state-of-the-art solution may meet timing and blockage constraints but may not sufficiently reflect timing slew (buffer reach).

With the proposed concept, additional buffers in signal lines being in conflict with blockage areas may be avoided with the advantageous effects of requiring less power, no need for additional chip area and no need for manual routing efforts. This helps to reduce the overall length of wires into different metal layers of the VLSI chip. Thus, more powerful chips may be designed in less time and more cost-effective.

In the following, additional embodiments of the inventive concept as well as the related system will be described.

According to one embodiment of the invention, the modifying the physical characteristics of the signal line may include inserting a buffer before and/or after the segment of the signal line. Such a buffer may have potentially "more power" compared to other buffers of the given layer. Thus, "more power" may bridge larger distances for longer segments crossing the blockage area without an additional buffer within the blockage area.

According to one embodiment of the invention, the modifying the physical characteristics of the signal line may include selecting another wire layer crossing the blockage area if compared to the wire layer of other segments of the signal line. Thereby, the other wire layer may have a larger cross section. This process may also be called up-tagging of a signal line or a segment of a signal line respectively. As known, higher contact or metal layer in a semiconductor layer stack have typically a larger cross section. Thus, the length of a segment may be longer without inserting a buffer into the signal line.

According to one embodiment of the invention, the larger cross section may be achieved by a larger width and/or a larger height of the related wire. As just mentioned, higher metal layers of semiconductors have this characteristic. However, it may also be possible to stay in the same metal layer and broaden the wire of the segment. Also, this would allow for a longer segment without inserting a buffer.

Consequently, and according to one embodiment of the invention, the modifying the physical characteristics of the signal line may include increasing a width of the wire of the segment of a given wire layer. A skilled person will understand that this alternative may avoid an up-tagging.

However, according to one preferred embodiment of the method, the other wire layer may be a higher wire layer if compared to a highest wire layer used for elements of the blockage area. Thus, the highest metal layer of semiconductor devices of the blockage area may not be influenced by the signal line crossing the blockage area.

According to one embodiment of the invention, the higher wire layer may include at least one wire—in particular segments—taking course under other angles than lower wire layers. This may be in contrast to typical Manhattan type routing approaches. But it may be allowed to have wires with angles that do not run under 0° or 90° over the blockage area. However, any other angle for a wire segment may be allowed, e.g., 45° relative to one side of a rectangle blockage area which may typically be a rectangle area.

According to one embodiment of the invention, the selecting another wire layer may include using a cycle reach table. It may define the signal reach depending on the type of buffer and the characteristics of the wire of a selected wire layer. Thus, a determination may be made for a wire having a buffer how long the signals may run over the wire without being degenerated, i.e., before the signal form (rising/falling edge) and/or the timing fall out of the specifications, and after what distance a re-amplification by a buffer may be needed.

According to an embodiment of the invention, the design data also may describe a layout of a related VLSI chip. However, also other types of semiconductor chips may be a target of the here proposed method. Basically, the new concept may be chip type agnostic.

According to an embodiment of the invention, the method may also include routing signal lines and inserting buffers in the signal lines for segments outside of the blockage area such that the slew rate and slack rate constraints are met. This step may also include inserting a type of buffer which may be adapted to have a higher drive power than standard buffers for a certain layer of the semiconductor chip. Such a driver then may drive a segment of the signals path having a larger cross section and running monger distances, e.g., across the blockage area.

In the following, a detailed description of the figures will be given. All instructions in the figures are schematic. Firstly, a block diagram of an embodiment of the inventive method for optimizing design data for a semiconductor circuit is given. Afterwards, further embodiments, as well as embodiments of the system for optimizing design data for a semiconductor circuit, will be described.

FIG. 1 shows a block diagram of an embodiment of the method 100 for optimizing design data for a semiconductor circuit. The design data describe—among others—a signal line and physical characteristics of the signal line. The method includes receiving, 102, the design data, e.g., from a semiconductor design system, for the signal line. The signal line typically originates at a source pins, connector or terminal and ends at a sink, or connector or terminal. It may be noted that more than one sink may be reached with split signal lines originating from one source.

The method 100 further includes receiving, 104, constraint data—in particular timing constraints like signals characteristics for signal forms at source, as well as at the sink, leading falling edge steepness and so on. Additionally, the constraint data describe at least one blockage area that must be free of buffers present along the signal line from the source to the sink. The blockage area may host an adder or an array of devices in-between there is no room for an additional buffer for a signal line running across the blockage area. It may also be noted that these "additional buffers" are only those not being part of the original netlist, i.e., only required because of routing purposes.

The method 100 includes determining, 106, a segment and a related length of the signal line that would physically overlap with the blockage area assuming a direct path—in particular according to Manhattan routing rules—from the source to the sink. It may be understood that a segment denotes a wire or direct connecting element between two buffers. In an ideal case, no buffer may be required between a signal source and a signal sink. However, due to degrading signals preciseness, buffers may be included in the signal line during the routing process.

Additionally, the method 100 also includes determining, 108, for the segment, based on the length of the segment—and also based on the cross section of the wire depending on layer—whether the segment is route-able without inserting a buffer in the segment while meeting the timing constraints, i.e., crossing the blockage area and still meeting timing constraints. The timing constraints may have been received together with the constraint data.

If a segment of the signal line is not route-able without inserting a buffer, the method 100 includes modifying, 110, the physical characteristics of the signal line. This may be achieved by up-tagging, i.e. use of a higher metal layer or using a wider wire on the same metal layer, thus, increasing the cross section of the used wire, i.e., segment, for the length of the segment. At the beginning and at the end of the segment crossing a blockage area, typically a buffer may be positioned. The drive power of the buffer may need to be adapted due to a higher number of charges required.

A point to note is that the three steps of determining the segment and the related length, the determining whether the segment length is route-able, and the modifying the physical characteristics of the signal line is performed, 112, before placing buffers in the signal line and routing the signal line, i.e., very early in the process.

FIG. 2a, 2b, 2c illustrate the concept of the here proposed solution for crossing a blockage area in contrast to existing routing approaches.

A signal line may have to be connected from a source 202 to a sink 204. As one can easily see, the signal line from the source 202 to the sink 204 (marked as dotted line) may cross a blockage area 200 at least partially. The blocking area may be defined by its respective coordinates, e.g., the lower left corner plus a width 208 and a height 210. However, relevant for the problem solution here is the intersection width $w_{intersect}$ and the related intersection height $h_{intersect}$. This may define the area in which not any additional buffer may be inserted into the signal path because of requirements according to a cycle reach table which may define the maximum reach of a signal on a signal line without an amplification by a buffer in order to meet the timing constraints (slow and slack). It may also be understood that an additional buffer may have always to be integrated into the semiconductor surface, i.e., among the other devices present in the blockage area.

An example for a current solution of the above-mentioned problem is shown in FIG. 2b. Here, a signal originating at the source 202 may have two destinations: sink 204 and sink 206. The signal line from source 202 to sink 206 is not influenced by the blockage area 200. Because of a maximum allowed the wire segment length along the signal line and timing constraints two buffers 208 and 210 have been inserted into the signal line. In the signal line from the source 202 to the sink 204 additionally the buffers 212, 214 and 216 are present. However, between buffer 212 and buffer 214 an additional buffer 218 may be required because of a too long wire length along the signal path between buffer 212 and buffer 214, because it is not allowed (constraints/blockage area) to place an additional buffer—e.g., buffer 218—within the blockage area 200. Therefore, the additional buffer 218 has to be placed outside the blockage area 200 which may lead to a consumption of additional wire space in the given wire layer.

In contrast to this, FIG. 2c shows the inventive concept. The buffers are basically the same as in FIG. 2b, and will not be described again. However, buffer 218 of FIG. 2b is missing because it is no longer required. The segment of the signal line between buffer 212 and buffer 214 is shown in a more bold fashion. This may indicate that this segment 216 of the signal line may be implemented with different physical characteristics if compared to the remaining segments of the signal path between the source 202 and the sink 204. Thus, the segment 216 may be implemented as a higher wire layer meeting the timing constraints between buffer 212 and buffer 214. In some cases, it may be required to choose a different layout of the buffer 212 in order to drive the required charge/current onto the segment 216 and/or to receive the incoming signal to the buffer 214 in order to meet the timing constraints.

Thus, the additional buffer 218 required in the standard process is no longer required saving space and power. This activity of choosing different physical characteristics of the segment 218 is performed before placing additional buffers, e.g., during and outside of routing process. It may be understood that the buffer 218 was not part of the original netlist for the signal paths from the source 202 to the sink 204.

FIG. 3 shows an embodiment of a more sophisticated flowchart 300 illustrating the proposed concept. The process starts at the top of the page starting a loop process 302 so that the subsequent algorithm is performed for each net of all nets of a VLSI chip. The next integrated loop process 304 is performed for each sink of each net. The integrated loop process starting at 306 is performing the algorithm for each blockage area.

At 308 it may be determined whether the width $w_{intersection}$ is larger than the maximum allowed distance between two buffers $d_{bb}$. If that is the case—case "Y"—a determination is made, 310, whether the intersection height $h_{intersection}$ is larger than the height $h_{search}$ of the search area. If that is not the case—case "N"—a next determination 312 is performed, determining whether the intersection height $h_{intersection}$ is larger than the maximum allowed distance between two buffers $d_{bb}$. If that is the case—case "Y"—it is determined, 314, whether $w_{inters} > w_{search}$. If that is not the case—case "N"—it is determined, 324, whether this is the last blockage area. If not, the process is performed for the next blockage area. Otherwise it is determined, 326, whether it is the last sink in a given signal line. If that is not the case—case "N"—it is determined, 328, whether this is the net. If not, the process is performed for the next net.

However, if it is either determined that $h_{inters} > h_{search}$ or $w_{inters} > w_{search}$ is true (compare determinations 310, 314), the algorithm continues with choosing, 316, the lowest/slowest wire trait with $d_{bb} > w_{intersection} / h_{intersection}$ for a new net (after buffer placement two steps further).

Next, the process continues with finding, 318, these placement-congested coordinates along $w_{intersection} / h_{intersection}$ for a horizontal/vertical section of the segment of the signal line with this current wire trait. In a next step, 320, the process continues with placing a first buffer at closest free location to this coordinate on both sides of the intersection area. This is performed—if possible—at a distance no longer than $d_{bb}$. Finally, the signal path continues after the second buffer with a wire trait which is the same as the wire trait when reaching the first buffer. Thus, the wire trait before the first buffer and after the second buffer is identical.

However, the segment between the first and the second buffer may have different physical characteristics in terms of a higher wire trait/wire layer or a wire segment with a larger cross-section. In both cases, the wire layer used between the first and the second buffer is above the highest wire layer used by elements of the blockage area. After the blockage area is crossed the wire trait is put back, 322, to its original value, i.e., to the original layer.

FIG. 4 shows an embodiment of a system 400 for optimizing design data for a semiconductor circuit. Also here, the design data describe a signal line and physical characteristics of the signal line. The system 400 includes a receiving unit 402 which is adapted for receiving the design data for the signal line originating at a source and ending at a sink. The receiving unit is also adapted for receiving constraint data describing a blockage area that must be free of buffers present along the signal line from the source to the sink.

Furthermore, the system 400 includes a determination module 404 adapted for determining a segment and a related length of the signal line that would overlap with the blockage area assuming a direct path from the source to the sink. The determination module 404 is also adapted for determining for the segment, based on the length of the segment, whether the segment is route-able without inserting a buffer in the segment while meeting the given timing constraints, received as part of the constraint data.

Moreover, the system 400 includes a modifying module 406 adapted for modifying, in case a segment is not route-able without inserting a buffer, the physical characteristics of the signal.

As notable feature, the reader may be pointed to the fact that one of the advantages of the proposed system is that the determination module and the modifying module are adapted for performing the determination of the segment, the determination whether the segment length is route-able, and the modification of the physical characteristics of the signal line before placing buffers in the signal line and routing the signal line—hence, very early in the design process.

Embodiments of the invention may be implemented together with virtually any type of computer, regardless of the platform being suitable for storing and/or executing program code. FIG. 5 shows, as an example, a computing system 500 suitable for executing program code related to the proposed method.

The computing system 500 is only one example of a suitable computer system and is not intended to suggest any limitation as to the scope of use or functionality of embodiments of the invention described herein. Regardless, computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couples various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limitation, as well as an operating system, one or more application programs, other program modules, and program data. Each of the operating system, one or more application programs, other program modules, and program data or some combination thereof, may include an implementation of a networking environment. Program modules 516 generally carry out the functions and/or methodologies of embodiments of the invention as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the system 400 for optimizing design data for a semiconductor circuit may be attached to the bus system 506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for processing design data for a semiconductor circuit, said design data describing a signal line and physical characteristics of said signal line, said method comprising:

receiving said design data for said signal line originating at a source and ending at a sink;

receiving constraint data describing a blockage area that must be free of buffers present along said signal line from said source to said sink;

determining a segment and a related length of said signal line that would overlap with said blockage area assuming a direct path from said source to said sink;

determining for said segment, based on said length of said segment, whether said segment is route-able without inserting a buffer in said segment while meeting said timing constraints received as part of the constraint data; and modifying, in case a segment is not route-able without inserting a buffer, said physical characteristics of said signal line, the modifying comprising inserting a buffer after said segment of said signal line, wherein said modifying said physical characteristics of said signal line comprises selecting another wire layer crossing said blockage area when compared to said wire layer of other segments of said signal line, wherein said other wire layer has a larger cross section, wherein said other wire layer is a higher wire layer when compared to a highest wire layer used for elements of said blockage area, wherein said higher wire layer comprises wires taking course under other angles than lower wire layers;

wherein said determining said segment and said related length, said determining whether said segment length is route-able, and said modifying said physical characteristics of said signal line is performed before placing buffers in said signal line and routing said signal line.

2. The method according to claim 1, wherein said modifying said physical characteristics of said signal line comprises:

inserting a buffer before said segment of said signal line.

3. The method according to claim 1, wherein said larger cross section is achieved by a larger width and/or a larger height of said related wire.

4. The method according to claim 1, wherein said modifying said physical characteristics of said signal line comprises:

increasing a width of said wire of said segment of a given wire layer.

5. The method according to claim 1, wherein said selecting another wire layer comprises:

using a cycle reach table.

6. The method according to claim 1, wherein said design data also describe a layout of a related very large scale integration (VLSI) chip.

7. The method according to claim 1, further comprising:

routing signal lines and inserting buffers in said signal lines for segments outside of said blockage area such that slew rate and slack rate constraints are met.

8. A system for optimizing design data for a semiconductor circuit, said design data describing a signal line and physical characteristics of said signal line, said system comprising:

a processor; and a non-transitory storage medium storing programming instructions executable by the processor to perform a method, the method comprising:

receiving said design data for said signal line originating at a source and ending at a sink, wherein said receiving unit is also adapted for receiving constraint data describing a blockage area that must be free of buffers present along said signal line from said source to said sink;

determining a segment and a related length of said signal line that would overlap with said blockage area assuming a direct path from said source to said sink, wherein said determination module is also adapted for determining for said segment, based on said length of said segment, whether said segment is route-able without inserting a buffer in said segment while meeting said timing constraints; and modifying, in case a segment is not route-able without inserting a buffer, said physical characteristics of said signal, the modifying comprising inserting a buffer after said segment of said signal line, wherein said modifying comprises selecting another wire layer crossing said blockage area when compared to said wire layer of other segments of said signal line, wherein said other wire layer has a larger cross section, wherein said other wire layer is a higher wire layer when compared to a highest wire layer used for elements of said blockage area, wherein said higher wire layer comprises wires taking course under other angles than lower wire layers;

wherein said determination module and said modifying module are adapted for performing said determination of said segment, said determination, whether said segment length is route-able, and said modification of said physical characteristics of said signal line is performed before placing buffers in said signal line and routing said signal line.

9. The system according to claim 8, wherein said modifying comprises inserting a buffer before said segment of said signal line.

10. The system according to claim 8, wherein said larger cross section comprises a larger width and/or a larger height of said related wire.

11. The system according to claim 8, wherein said modifying comprises increasing a width of said wire of said segment of a given wire layer.

12. The system according to claim 8, wherein said selecting another wire layer comprises using a cycle reach.

13. The system according to claim 8, wherein the method further comprises:

a routing module adapted for routing signal lines and inserting buffers in said signal lines for segments outside of said blockage area such that slew rate and slack rate constraints are met.

14. A computer program product for processing design data for a semiconductor circuit, said design data describing a signal line and physical characteristics of said signal line, said computer program product comprising a computer readable storage medium having program instructions embodied therewith, said program instructions being executable by one or more computing systems to cause said one or more computing systems to:

receive said design data for said signal line originating at a source and ending at a sink;

receive constraint data describing a blockage area that must be free of buffers present along said signal line from said source to said sink;

determine a segment and a related length of said signal line that would overlap with said blockage area assuming a direct link from said source to said sink;

determine for said segment, based on said length of said segment, whether said segment is route-able without inserting a buffer in said segment; and modify, in case a segment is not route-able without inserting a buffer, data describing said physical characteristics of said signal line, the programming instructions further causing said one or more computing systems to insert a buffer after said segment of said signal line, wherein said modifying comprises selecting another wire layer crossing said blockage area when compared to said wire layer of other segments of said signal line, wherein said other wire layer has a larger cross section, wherein said other wire layer is a higher wire layer when compared to a highest wire layer used for elements of said blockage area, wherein said higher wire layer comprises wires taking course under other angles than lower wire layers;

wherein said determination of said segment, said determination of whether said segment length is route-able, and said modification of said physical characteristics of said signal line is performed before placing buffers in said signal line and routing said signal line.

* * * * *